US012523766B2

(12) United States Patent
Mori et al.

(10) Patent No.: US 12,523,766 B2
(45) Date of Patent: Jan. 13, 2026

(54) SENSOR BRACKET

(71) Applicants: NIFCO INC., Yokosuka (JP); HONDA MOTOR CO., LTD., Tokyo (JP)

(72) Inventors: Daisuke Mori, Kanagawa (JP); Shingo Nakayama, Tokyo (JP)

(73) Assignees: NIFCO INC., Kanagawa (JP); HONDA MOTOR CO., LTD., Tokyo (JP)

( * ) Notice: Subject to any disclaimer, the term of this patent is extended or adjusted under 35 U.S.C. 154(b) by 470 days.

(21) Appl. No.: 18/177,231

(22) Filed: Mar. 2, 2023

(65) Prior Publication Data

US 2023/0280444 A1    Sep. 7, 2023

(30) Foreign Application Priority Data

Mar. 7, 2022   (JP) ................................ 2022-034044

(51) Int. Cl.
*G01S 13/931*    (2020.01)

(52) U.S. Cl.
CPC ..... *G01S 13/931* (2013.01); *G01S 2013/9323* (2020.01); *G01S 2013/9324* (2020.01)

(58) Field of Classification Search
CPC .......... G01S 7/027; G01S 7/02; G01S 13/931; G01S 2013/9323; G01S 17/931; G01S 2013/9324; G01S 7/4813; G01S 7/521; G01S 15/931; G01S 2015/937
USPC .... 248/200, 220.21, 220.22, 222.11, 222.12, 248/222.51, 309.1, 310, 346.01, 346.03, 248/346.04, 346.5
See application file for complete search history.

(56) References Cited

U.S. PATENT DOCUMENTS

| | | | |
|---|---|---|---|
| 5,069,407 A | 12/1991 | Williams | |
| 11,292,396 B2 | 4/2022 | Hwang | |
| 12,246,652 B2* | 3/2025 | Nakayama | ............. B60R 13/04 |
| 2012/0126678 A1* | 5/2012 | Eromaki | .................. H05K 7/12 |
| | | | 29/829 |
| 2020/0172020 A1* | 6/2020 | Nakayama | ............ G01S 13/931 |
| 2021/0293920 A1* | 9/2021 | Cavazos | ................ H01Q 1/125 |

FOREIGN PATENT DOCUMENTS

| | | |
|---|---|---|
| JP | 2014192335 A | 10/2014 |
| JP | 2018012387 A | 1/2018 |
| JP | 2020091259 A | 6/2020 |
| JP | 2021169283 A | 10/2021 |

OTHER PUBLICATIONS

Notice of Reasons for Refusal for for Japanese Patent Application No. 2022-034044 dated Mar. 5, 2025; 6 pp.

* cited by examiner

*Primary Examiner* — Alfred J Wujciak
(74) *Attorney, Agent, or Firm* — Armstrong Teasdale LLP (57) ABSTRACT

A sensor bracket (1) for mounting a sensor (2) to a vehicle body, comprising: a base wall (10) opposing a back surface of the sensor; a pair of first positioning portions (25) projecting from the base wall and abutting a side edge of the sensor from a first direction extending along the base wall; a pair of first pressing portions (26) projecting from the base wall and pressing the sensor against the first positioning portion in the first direction; and a first engaging portion (27) projecting from the base wall and engaging the sensor against a movement thereof away from the base wall, the first engaging portion being positioned between the first positioning portions and the first pressing portions along the first direction.

12 Claims, 8 Drawing Sheets

SENSOR BRACKET

TECHNICAL FIELD

The present invention relates to a sensor bracket for mounting a sensor to a vehicle body.

BACKGROUND ART

JP2020-91259A discloses a bracket for mounting a radar to a vehicle body. The bracket includes a positioning portion that abuts against a side edge of the radar, a pressing portion that presses the other side edge of the radar toward the positioning portion, and a plurality of engaging portions that engage the two edge portions of the radar to prevent detachment of the radar from the bracket.

Since the bracket disclosed in JP2020-91259A is provided with a plurality of engaging portions on either side of the positioning portions and the pressing portions, the position of the radar relative to bracket is not so secure or accurate as desired.

SUMMARY OF THE INVENTION

In view of such a problem of the prior art, a primary object of the present invention is to provide a sensor bracket that can support a sensor with a high precision.

To achieve such an object, a certain aspect of the present invention provides a sensor bracket (1) for mounting a sensor (2) to a vehicle body, comprising: a base wall (10) opposing a back surface of the sensor; at least one first positioning portion (25) projecting from the base wall and abutting a side edge of the sensor from a first direction extending along the base wall; at least one first pressing portion (26) projecting from the base wall and pressing the sensor against the first positioning portion in the first direction; and a first engaging portion (27) projecting from the base wall and engaging the sensor against a movement thereof away from the base wall, the first engaging portion being positioned between the at least one first positioning portion and the at least one pressing portion along the first direction.

Since the first engaging portion engage the sensor at a position located between the at least one first positioning portion and the at least one first pressing portion along the first direction, the sensor can be accurately supported by the bracket.

Preferably, in this sensor bracket, the sensor includes a sensor main body (4), and a coupling piece (5-7) extending along the base wall in a second direction crossing the first direction, and one of the at least one first positioning portion or one of the at least one first pressing portion abuts against a side edge of the coupling piece.

Since one of the at least one first positioning portion or one of the at least one first pressing portion abuts against a side edge of the coupling piece, instead of the side edge of the sensor main body, the positioning action of the one of the at least one first positioning portion or one of the at least one first pressing portion can be improved.

Preferably, in this sensor bracket, the coupling piece is positioned between the at least one first pressing portion and the at least one first positioning portion along the first direction.

Thereby, the sensor can be particularly accurately supported by the bracket.

Preferably, in this sensor bracket, one of the at least one first positioning portion, one of the at least one first pressing portion, and the side edge of the first coupling piece substantially align with one another along the first direction.

Thereby, the sensor can be supported by the bracket in a particularly stable manner.

Preferably, in this sensor bracket, the coupling piece includes a first coupling piece (5) and a second coupling piece (6) that are positioned along the first direction in a spaced apart relationship, and one of the at least one first pressing portion presses against the first coupling piece while one of the at least one first positioning portion abuts against the second coupling piece.

Thereby, the sensor can be supported by the bracket in a particularly accurate and stable manner.

Preferably, in this sensor bracket, the sensor further includes a third coupling piece (7) extending from a side of the sensor main body opposite from the first coupling piece and the second coupling piece, and a second engaging portion extending from the base wall to engage the third coupling piece against a movement of the sensor away from the base wall.

Thereby, the sensor can be supported by the bracket in a particularly accurate and stable manner.

Preferably, in this sensor bracket, the first engaging portion includes a pair of first engaging portions that are positioned in a mutually spaced apart relationship along the first direction between one of the at least one first positioning portion and one of the at least one first pressing portion, the sensor being restricted from a movement away from the base wall by the first engaging portions and the second engaging portion substantially solely at three points.

By restricting the sensor from a movement away from the base wall substantially at three points, the position, in particular the angular position of front surface of the sensor can be made both stable and accurate.

Preferably, in this sensor bracket, the first, second and third coupling pieces are each provided with a front surface which recedes from a front surface of the sensor main body.

Thereby, the engagement portions can be made adequately sturdy without substantially protruding from the front surface of the radar.

Preferably, in this sensor bracket, the first engaging portion includes a pillar projecting from the base wall, and a claw extending from a tip end of the pillar in the first direction, and the claw includes an engaging surface facing the base wall and a guide surface extending from an end of the engaging surface to the tip end of the pillar.

Thereby, the sensor can be easily engaged to the first engaging portion. Owing to the presence of the guide surface which may consist of a curved and/or slanted surface, the sensor can be firmly engaged by the claw or the engaging surface thereof without requiring an excessive force in pushing the sensor into the engaged state.

Preferably, in this sensor bracket, the at least one first positioning portion and the at least one first pressing portion are each provided in a pair which are spaced apart from each other in a second direction crossing the first direction.

Thereby, the radar can be positioned in the first direction in a particularly stable manner.

Preferably, in this sensor bracket, the sensor bracket further comprises an at least one second positioning portion abutting against the sensor in the second direction, and at least one second pressing portion pressing the sensor against the at least one second positioning portion in the second direction.

Thereby, the positioning of the sensor in the second direction can be properly achieved.

Preferably, in this sensor bracket, the at least one second positioning portion includes a pair of second positioning portions, and the at least one second pressing portion includes a pair of second pressing portions, the second positioning portions abutting against tip ends of the first coupling piece and the second coupling piece, respectively.

Thereby, the radar can be positioned in the second direction in a particularly stable manner.

Preferably, in this sensor bracket, the base wall is provided with a spring portion that urges the sensor away from the base wall.

By resiliently pressing the sensor against the engaging portion with the spring portion, the positioning of the sensor toward and away from the base wall can be achieved in a particularly favorable manner.

The present invention thus provides a sensor bracket that can support a sensor with a high precision.

Another aspect of the present invention provides a sensor mounting structure including the sensor bracket as defined above and a sensor configured to be mounted to the sensor bracket.

DESCRIPTION OF THE PREFERRED EMBODIMENT(S)

A sensor mounting structure according to an embodiment of the present invention will be described in the following with reference to the appended drawings.

Figure 1:
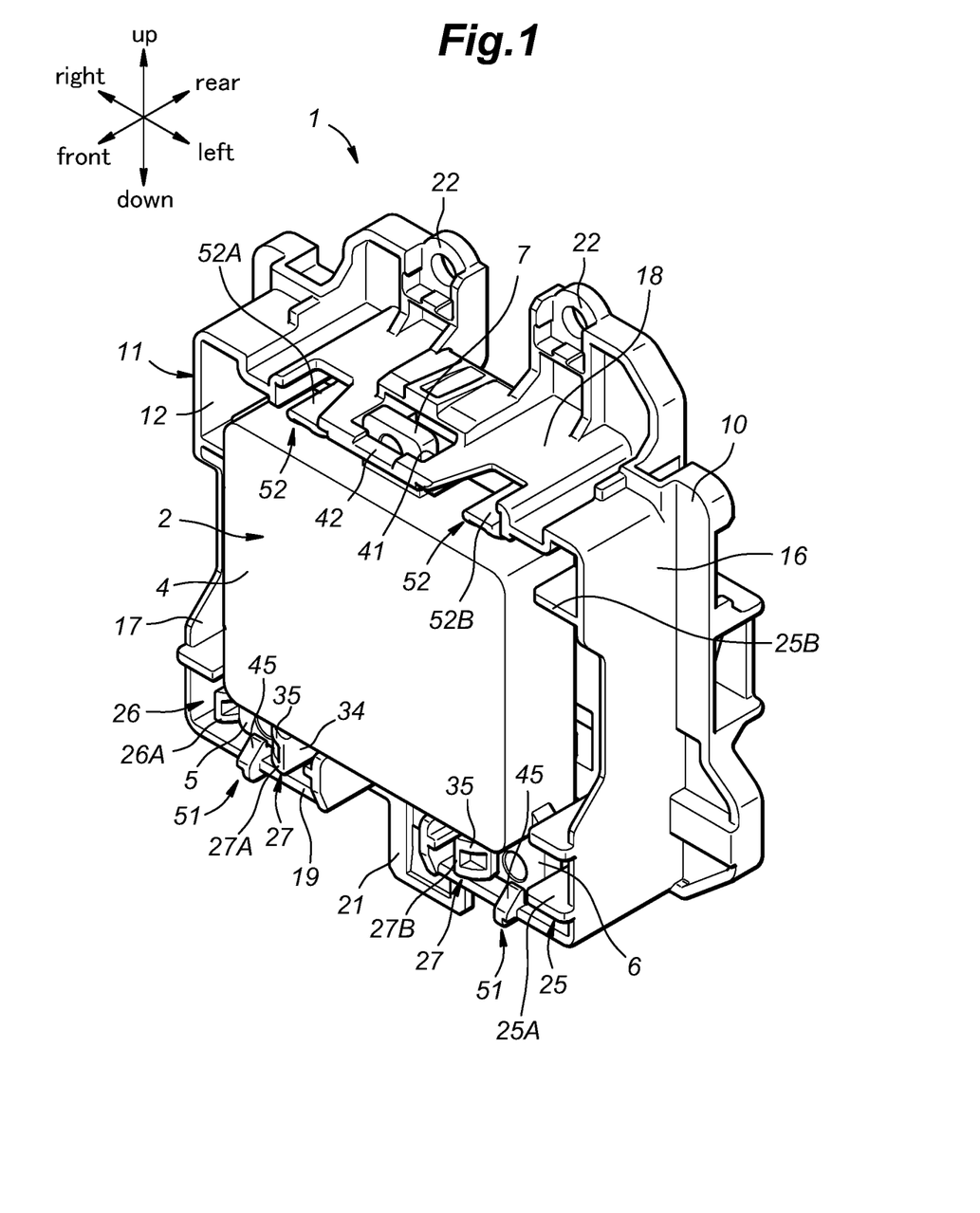
FIG. 1 is a front perspective view of the sensor and sensor bracket according to an embodiment of the present invention.
Figure 2:
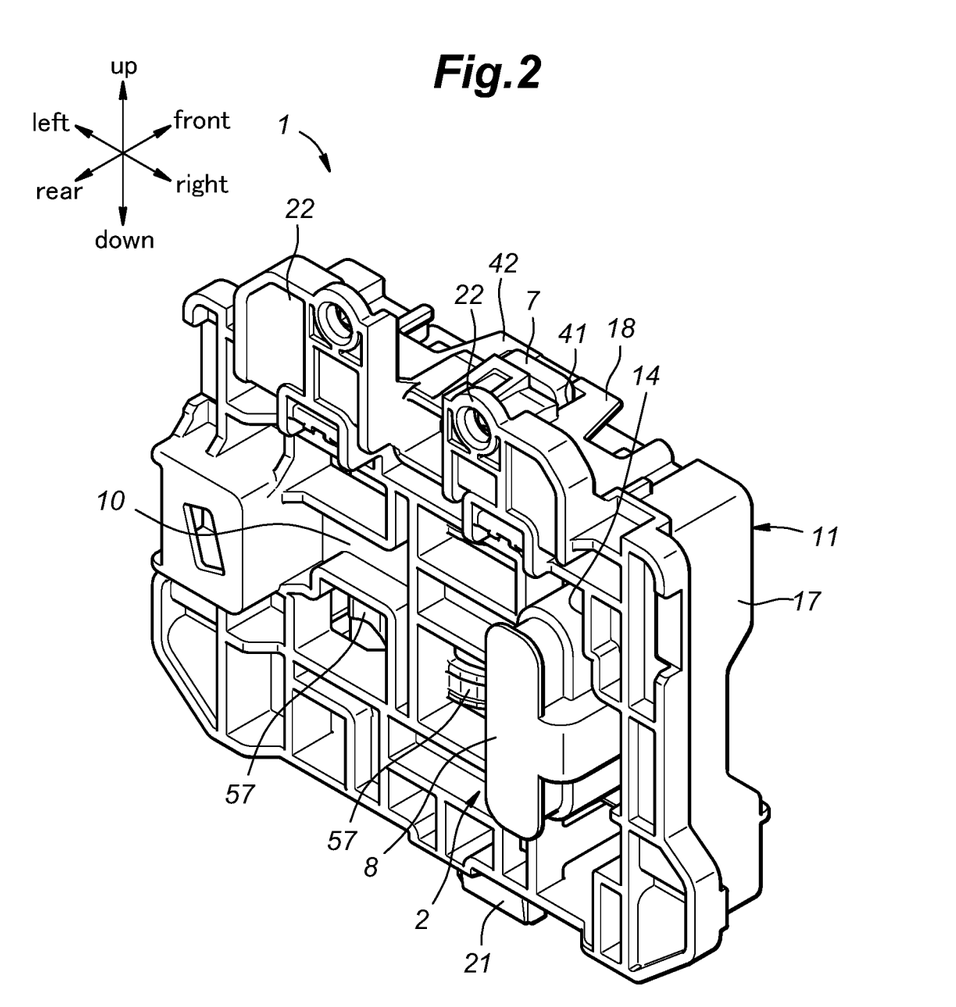
FIG. 2 is a rear perspective view of the sensor and sensor bracket.

FIGS. 1 and 2 show a sensor bracket 1 via which a sensor 2 is mounted on a vehicle body. The sensor 2 may be a radar, camera, LiDAR (Light Detection And Ranging), or sonar. The sensor 2 in this embodiment consists of a millimeter wave radar, but may also be a microwave radar, or sub-millimeter wave radar.

The sensor 2 emits radio wave, and measures the time required for the radio wave to bounce back from objects surrounding the vehicle as well as the direction from which the radio wave reaches the radar. Thereby, the locations of the surrounding objects can be detected.

Figure 3:
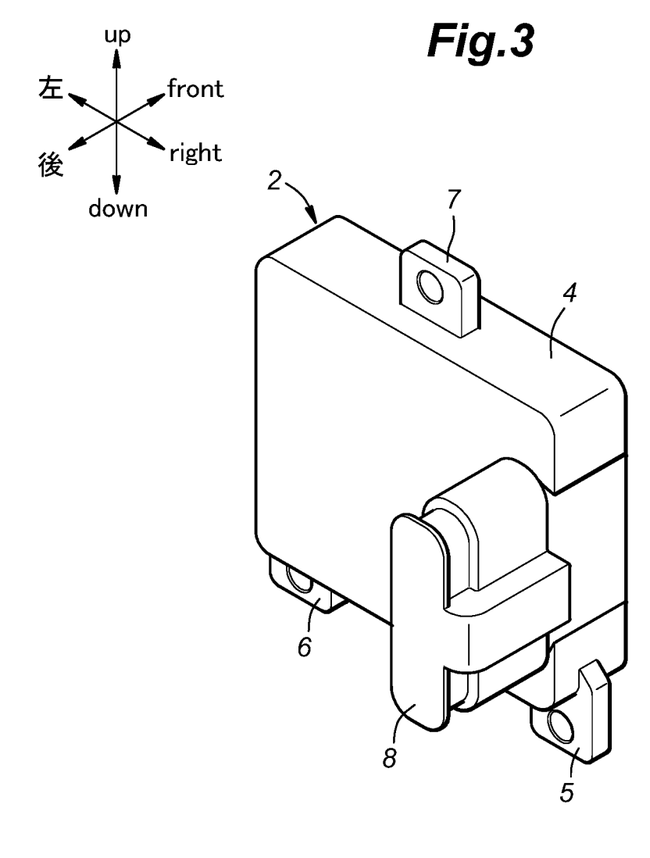
FIG. 3 is a rear perspective view of the sensor.

As shown in FIGS. 1 and 3, the sensor 2 is provided with a sensor main body 4, and three coupling pieces 5, 6, and 7 extending from the upper and lower edges of the sensor main body 4. The sensor main body 4 is formed as a flat rectangular parallelepiped member. In this embodiment, the sensor 2 is mounted on a front end of a vehicle with a major plane thereof extending orthogonally to the traveling direction (fore and aft direction) of the vehicle. Although the actual mounting posture of the sensor 2 is not limited to that of the illustrated embodiment, it is so assumed for the convenience of description. Further, the directions regarding the sensor may be assumed as indicated in the appended drawings, again, for the convenience of description.

The coupling pieces include a first coupling piece 5 and a second coupling piece 6 projecting downward from either side of a laterally central point of the lower edge of the sensor main body 4 in a mutually spaced apart relationship (symmetric to the central line), and a third coupling piece 7 projecting upward from a laterally central point of the bottom edge of the sensor main body 4. Each of the first coupling piece 5, the second coupling piece 6, and the third coupling piece 7 is formed in a plate-like shape whose major surfaces face forward and backward. The first coupling piece 5, the second coupling piece 6, and the third coupling piece 7 (in particular the front surfaces thereof) are positioned on a substantially common plane which is intermediate between the front surface and the rear surface of the sensor main body 4. More specifically, the front surfaces of the first coupling piece 5, the second coupling piece 6, and the third coupling piece 7 are set back or recede from the front surface of the sensor main body 4. Radio wave is emitted forward from the front surface of the sensor main body 4. Similarly, reflected wave is received through the front surface of sensor main body 4.

A connector portion 8 projects rearward from a right end of the sensor main body 4. The connector portion 8 is vertically elongated in this case, and is internally provided with an electrical connector for establishing an electrical connection between the sensor 2 and external circuitry not shown in the drawings.

The sensor bracket 1 may be attached to a structural member of a vehicle body such as a front bulkhead of the vehicle. Alternatively, the sensor bracket 1 may be attached to an exterior member of a vehicle body such as a front grille, a front bumper face, a rear bumper face, and the like. In this embodiment, the sensor bracket 1 is attached to the rear surface of a front grill.

The sensor bracket 1 may be made of plastic material such as polybutylene terephthalate resin, preferably reinforced by glass fibers.

Figure 4:
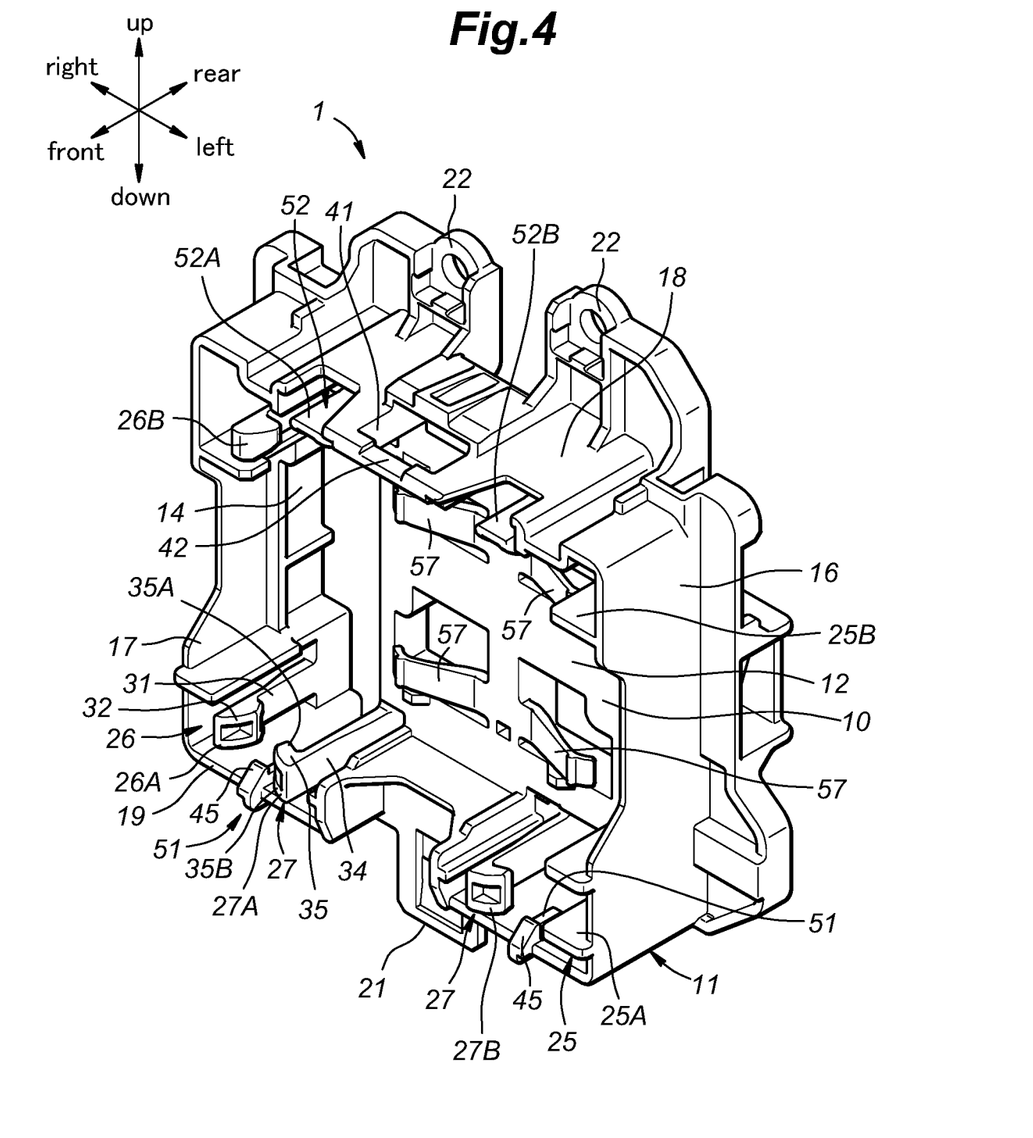
FIG. 4 is a front perspective view of the sensor bracket.
Figure 5:
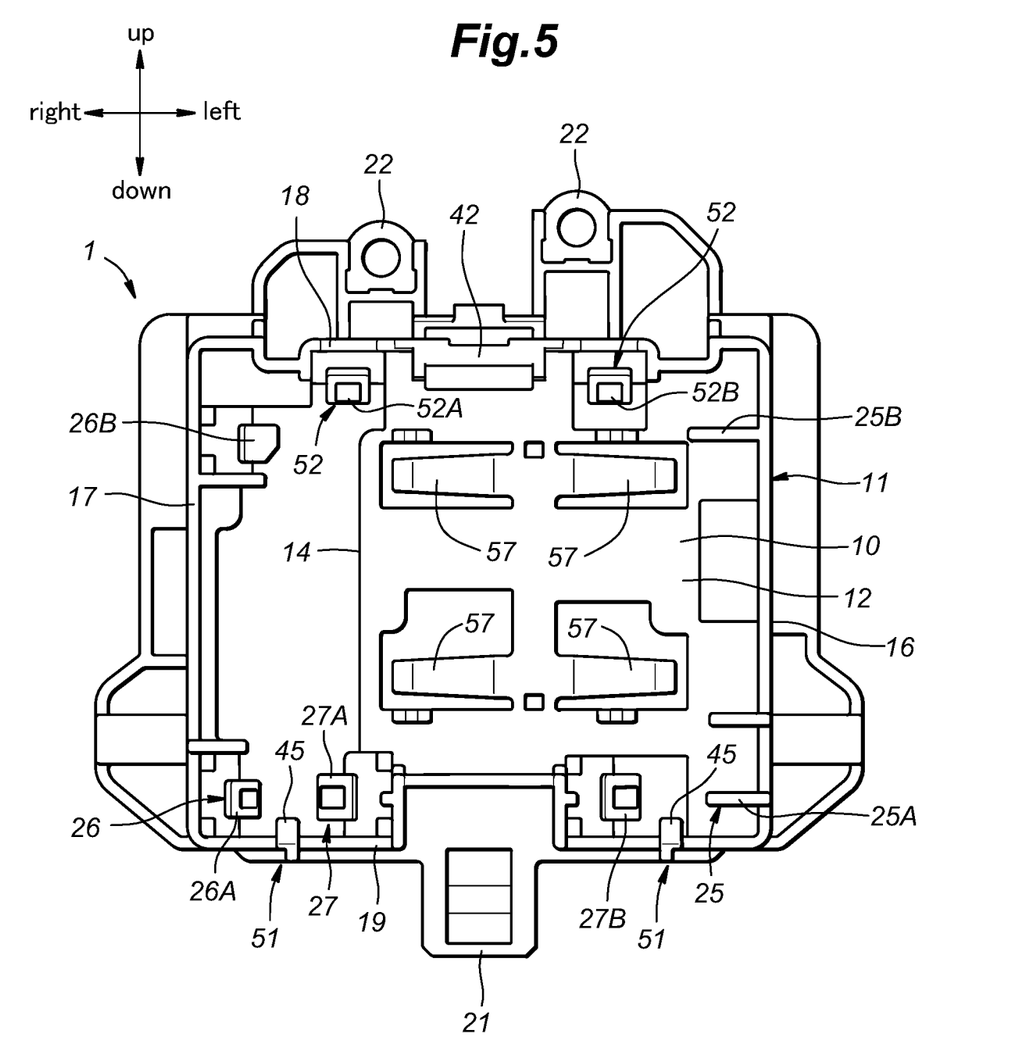
FIG. 5 is a front view of the sensor bracket.

As shown in FIGS. 4 and 5, the sensor bracket 1 includes a plate-like base wall 10 having a rectangular shape and facing in the fore and aft direction, and a side wall 11 extending forward from the peripheral edge of the base wall 10. Therefore, the base wall 10 and the side wall 11 jointly define a receiving recess 12 facing forward and receiving the sensor 2 therein. The front surface of the base wall 10 opposes the rear surface of the sensor 2. A connector opening 14 is passed through a right end part of the base wall 10 for accommodating the connector portion 8 therein. In the installed state of the sensor 2, the connector portion 8 of the sensor 2 extends rearwardly of the base wall 10 through the connector opening 14.

The side wall 11 includes a left edge wall 16 and a right edge wall 17 extending vertically along the left and right side edges of the base wall 10, respectively. The side wall 11 further includes an upper edge wall 18 extending horizontally between the upper ends of the left edge wall 16 and the right edge wall 17 along the upper edge of the base wall 10, and a lower edge wall 19 extending horizontally between the lower ends of the left edge wall 16 and the right edge wall 17 along the lower edge of the base wall 10.

A lower connecting piece 21 extends centrally downward from the lower edge of the base wall 10 as an extension thereof. A rectangular opening is passed through the lower connecting piece 21. A pair of upper connecting pieces 22 extend upward in a laterally spaced apart relationship on either side of a central line which vertically passes through the lower connecting piece 21. The upper connecting pieces 22 are each provided with an opening passed therethrough. The sensor bracket 1 is attached to the vehicle body at the lower connecting piece 21 and the upper connecting pieces 22. In this embodiment, the lower connecting piece 21 is inserted into a mounting hole formed on a rear side of the front grille, and the upper connecting pieces 22 are attached to rear parts of the front grille with screws.

The sensor bracket 1 is provided with a lower first positioning portion 25A and an upper first positioning portion 25B which abut against the left side of the sensor 2 to aid the lateral positioning of the sensor 2. The lower first positioning portion 25A consists of a wall member that is connected to both the left edge wall 16 and the base wall 10, and has a right edge that evenly abuts against the left side edge of the second coupling piece 6. The upper first positioning portion 25B similarly consists of a wall member that is connected to both the left edge wall 16 and the base wall 10, and has a right edge that evenly abuts against the opposing side of the sensor main body 4.

The sensor bracket 1 is provided with a lower first pressing portion 26A which consists of a pillar 31 or a strip extending upright from the base wall 10. The upper end of the pillar 31 is provided with a bulge 32 having a rounded surface opposing the right side edge of the first coupling piece 5.

Figure 6:
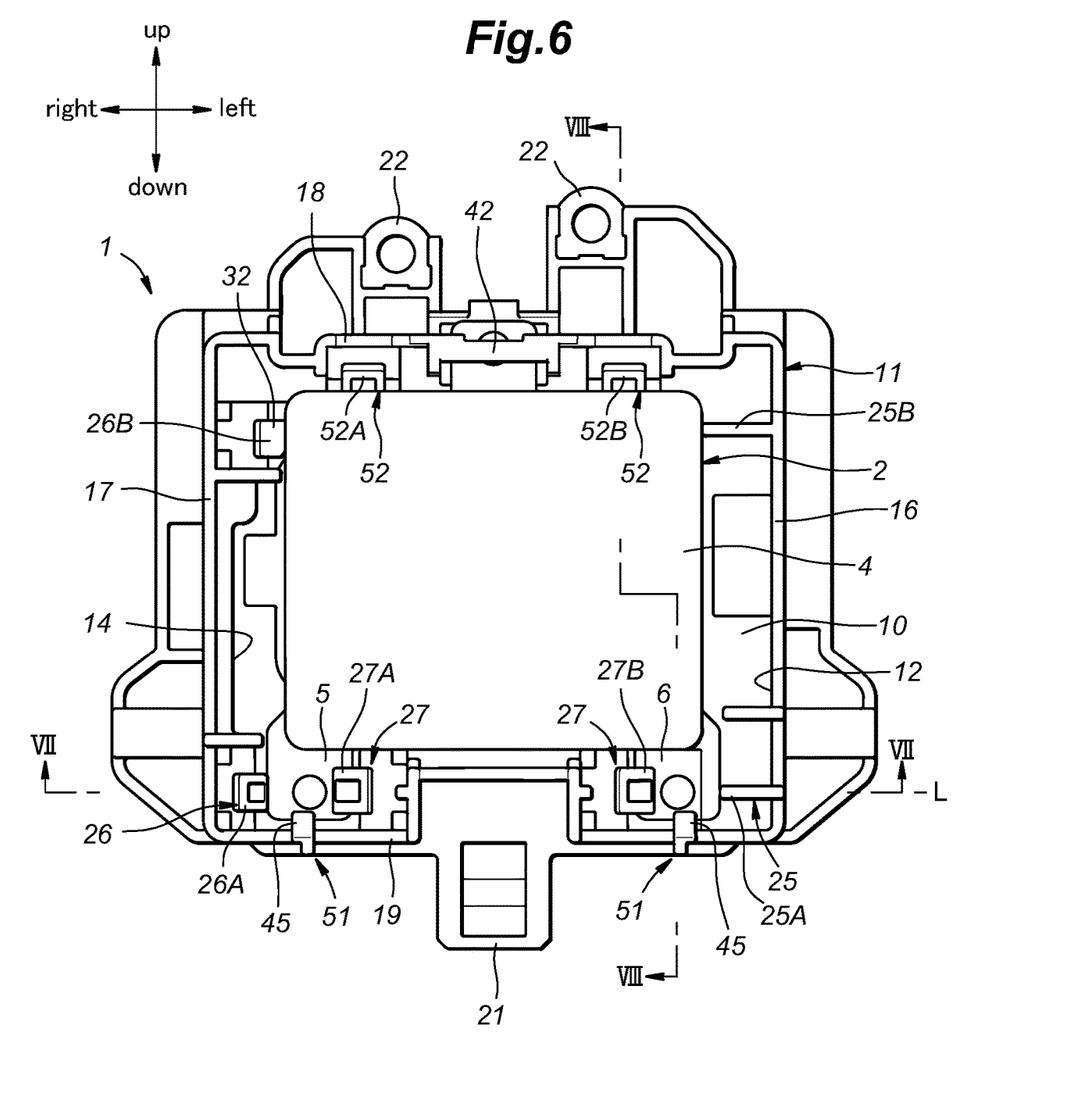
FIG. 6 is a front view of the sensor and sensor bracket.

In the installed state of the sensor 2, the lower first pressing portion 26A resiliently presses against the right side edge of the first coupling piece 5 while the sensor main body 4 itself is supported by the lower first positioning portion 25A which laterally aligns with the lower first pressing portion 26A. Thus, the sensor 2 is laterally and resiliently clamped between the lower first pressing portion 26A and the lower first positioning portion 25A along a same line of action (See line L in FIG. 6).

The sensor bracket 1 is further provided with an upper first pressing portion 26B which consists of a pillar or a strip extending upright from the base wall 10 similarly as the lower first pressing portion 26A. The upper end of the pillar 31 is provided with a bulge 32 having a rounded surface opposing the right side of the sensor main body 4.

In the installed state of the sensor 2, the upper first pressing portion 26B resiliently presses against the right side of the sensor main body 4 of the sensor 2 while the sensor main body 4 itself is supported by the upper first positioning portion 25B which laterally aligns with the upper first pressing portion 26B. Thus, the sensor 2 is laterally and resiliently clamped between the upper first pressing portion 26B and the upper first positioning portion 25B along a same line of action.

The base wall 10 is provided with four spring pieces 57 which are formed by cutting out the material of the base wall 10, and raised away from the base wall 10 (in the same direction as the side wall 11 extends from the base wall 10). These spring pieces 57 thus form cantilever springs which urge the sensor 2 away from the base wall 10 in the installed state of the sensor 2 as will be described hereinafter.

A pair of first engaging portions 27 project orthogonally from lower parts of the base wall 10 on either side of the central line which passes through the lower connecting piece 21. The right first engaging portion 27A includes a pillar 34 and a claw portion 35 formed at a free end of the pillar 34. The right first engaging portion 27A is configured to be flexed leftward under an external load. The claw portion 35 is provided with a guide surface 35B sloping rightward and downward from the free end of the claw portion 35, and an engaging surface 35A extending between the lower end of the guide surface 35B and the pillar 34. The guide surface 35B is convex in shape in side view, and the engaging surface 35A is substantially orthogonal to the extending direction of the pillar 34, and more preferably concave or slightly slanted away from the base wall 10 as one moves from the lower end of the guide surface toward the pillar 34.

The left first engaging portion 27B is similar in structure to the right first engaging portion 27A, but is a mirror image thereof with respect to the central line. In other words, the left first engaging portion 27B is provided with a claw portion 35 defining a guide surface 35B which slopes leftward and downward from the free end of the claw portion 35, and an engaging surface 35A extending between the lower end of the guide surface 35B and the pillar 34.

The claw portion 35 of the right first engaging portion 27A engages the left edge of the first coupling piece 5. In particular, the engaging surface 35A of the claw portion 35 of the right first engaging portion 27A engages the front surface of the first coupling piece 5 from the left edge of the first coupling piece 5. Similarly, the claw portion 35 of the left first engaging portion 27B engages the right edge of the second coupling piece 6. In particular, the engaging surface 35A of the claw portion 35 of the left first engaging portion 27B engages the front surface of the second coupling piece 6 from the right edge of the second coupling piece 6.

The first engaging portions 27 are positioned between the first positioning portions 25 and the first pressing portions 26 with respect to the lateral direction (first direction). In particular, the first engaging portions 27 are provided between the lower first positioning portion 25A and the lower first pressing portion 26A with respect to the lateral direction (first direction) substantially along a single straight line (L).

Figure 7:
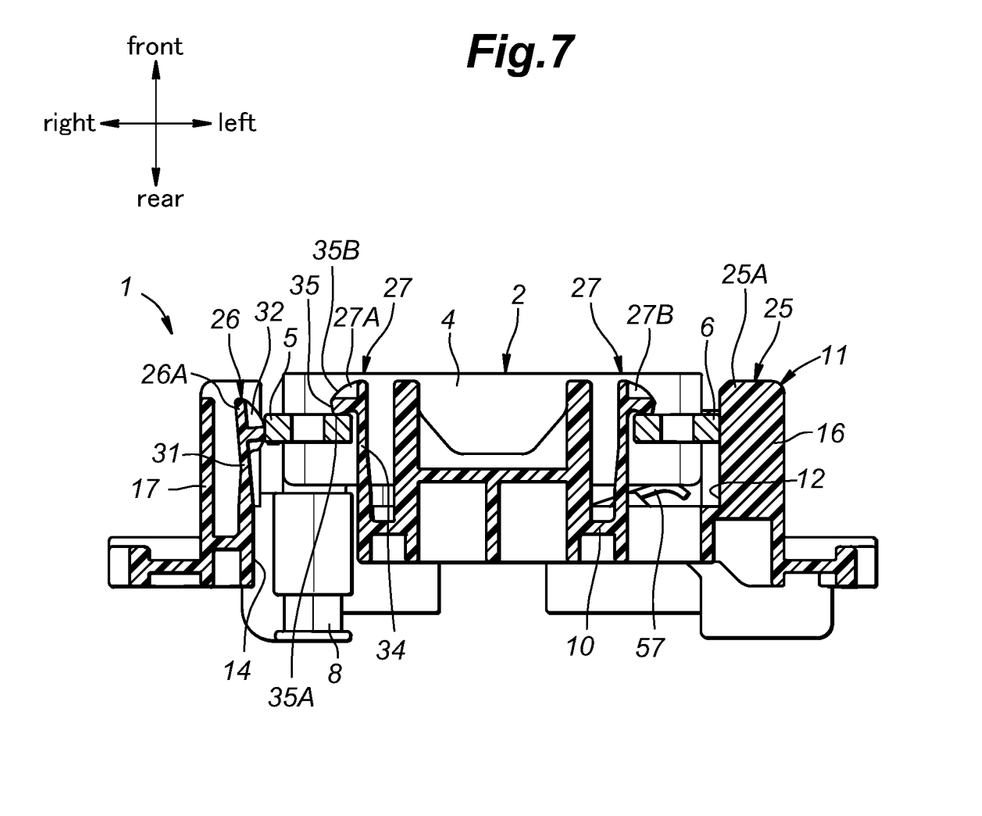
FIG. 7 is a sectional view taken along line VII-VII of FIG. 6.

The first coupling piece 5 is thus positioned between the lower first pressing portion 26A and the right first engaging portion 27A in the first direction. As best illustrated in FIG. 7, the right first engaging portion 27A restricts the movement of the first coupling piece 5 (sensor 2) away from the base wall 10, but does not substantially restrict the lateral movement of the first coupling piece 5 (sensor 2).

The second coupling piece 6 is positioned between the lower first positioning portion 25A and the left first engaging portion 27B in the first direction. As best illustrated in FIG. 7, the left first engaging portion 27B restricts the movement of the first coupling piece 5 (sensor 2) away from the base wall 10, but does not substantially restrict the lateral movement of the second coupling piece 6 (sensor 2).

The upper edge wall 18 is centrally provided with an engaging hole 41 so that a bar-like second engaging portion 42 is formed at the front edge of the upper edge wall 18. The third coupling piece 7 is passed upward through the engaging hole 41 so that the movement of the third coupling piece 7 (sensor 2) away from the base wall 10 is restricted owing to the engagement between the second engaging portion 42 and the third coupling piece 7.

Figure 8:
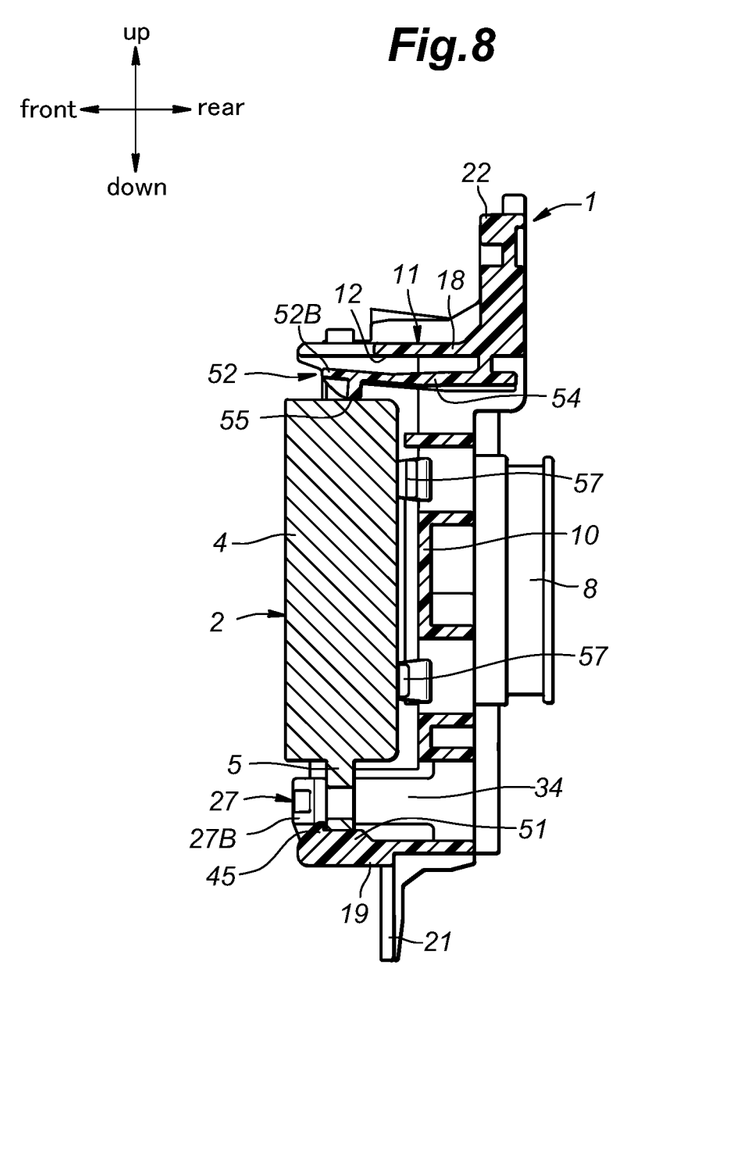
FIG. 8 is a sectional view taken along line VIII-VIII of FIG. 6.

Referring to FIG. 8 (in addition to FIGS. 4, 5, and 6), the lower edge wall 19 is formed with a pair of second positioning portions 51, each formed as a thick-walled part of the lower edge wall 19, on either side of the central line.

The second positioning portion 51 on the right is provided with a third engaging portion 45A that projects forward from the corresponding second positioning portion 51. The front end of the third engaging portion 45A on the right is provided with a guide surface that inclines rearward and upward. The upper (or rear) end of the guide surface continues to an engaging surface which faces upward and rearward (or an undercut surface). The right second positioning portion 51 is positioned laterally intermediate between the lower first pressing portion 26A and the right first engaging portion 27A such that the right second positioning portion 51 abuts against the lower edge or the tip end of the first coupling piece 5 in the installed state of the sensor 2.

The second positioning portion 51 on the left is provided with a third engaging portions 45B that projects forward from the corresponding second positioning portion 51. The front end of the third engaging portion 45B on the left is provided a guide surface that inclines rearward and upward. The upper (or rear) end of the guide surface continues to an engaging surface which faces upward and rearward (or an undercut surface). The left second positioning portion 51 is positioned laterally intermediate between the lower first positioning portion 25A and the left first engaging portion 27B such that the left second positioning portion 51 abuts against the lower edge or the tip end of the second coupling piece 6 in the installed state of the sensor 2.

The engaging surfaces of the third engaging portions 45 resiliently restrict the movement of the sensor 2 away from the base wall 10, but this restricting force is comparatively slight, and does not substantially provide a restriction action in the installed state of the sensor 2. The engaging surfaces of the third engaging portions 45 are provided primarily for the convenience of the assembly work.

Immediately below the upper edge wall 18, a pair of second pressing portions 52 are provided on either side of the center line. The right second pressing portion 52A includes a pillar 54 extending forward from the base wall 10, and a bulge 55 protruding downward from the front end of the pillar 54. The bulge 55 is provided with a guide surface that slants downward and rearward. The pillar 54 provides a resiliency to the right second pressing portion 52A. When the sensor 2 is placed in the receiving recess 12 defined by the side wall 11 and the base wall 10, the bulge 55 resiliently presses down the sensor 2 which is in turn supported from below by the second positioning portions 51. The guide surface aids the insertion of the sensor 2 into this receiving recess 12.

The left second pressing portion 52B is essentially identical to the right second pressing portion 52A in both structure and function, and may also be considered as a mirror image of the right second pressing portion 52A with respect to the center line.

The procedure for mounting the sensor 2 to the sensor bracket 1 will be described in the following. The operator first tilts the upper end of the sensor main body 4 rearward, and inserts the third coupling piece 7 into the engaging hole 41 of the second engaging portion 42 from below. Then, the operator tilts the lower end of the sensor main body 4 rearward with the third coupling piece 7 engaged by the second engaging portion 42 acting as a fulcrum until the first coupling piece 5 is engaged by the right first engaging portion 27A, and the second coupling piece 6 is engaged by the left first engaging portion 27B. At this time, the connector portion 8 of the sensor 2 is passed rearward through the connector opening 14 and protrudes rearward from the base wall 10. The sensor 2 is urged forward by the four spring pieces 57, and is held in position against the biasing force of the spring pieces 57 by the first engaging portions 27 and the second engaging portion 42. As a result, the fore and aft position of the sensor 2 relative to the sensor bracket 1 can be firmly determined.

When the sensor 2 is thus retained in the receiving recess 12 of the sensor bracket 1, the lower first pressing portion 26A presses the first coupling piece 5 leftward and the upper first pressing portion 26B presses the sensor main body 4 leftward, while the left end of the second coupling piece 6 is supported the lower first positioning portion 25A, and the left end of the sensor main body 4 is supported by the upper first positioning portion 25B. As a result, the lateral position of the sensor 2 relative to the sensor bracket 1 (in the first direction) can be firmly determined.

Also, the right second pressing portion 52A and the left second pressing portion 52B press the upper edge of the sensor main body 4 downward. The lower edge of the first coupling piece 5 and the second coupling piece 6 are supported by the corresponding second positioning portions 51 from below. As a result, the vertical position of the sensor 2 relative to the sensor bracket 1 (in the second direction) can be firmly determined.

In this sensor mounting structure, it is important that the assembling or mounting of the sensor 2 to the bracket 1 is easy. According to the illustrated embodiment, simply by inserting the third coupling piece 7 through the engaging hole 41, and pushing the lower part of the sensor 2 into the receiving recess 12 against the biasing force of the first engaging portions 27 (provided by the pillars 34 thereof) as well as the biasing force of the spring pieces 57, the sensor 2 can be securely placed in the receiving recess 12. The guide surfaces 35B of the first engaging portions 27 facilitate this process. Once the sensor 2 is fully received in the receiving recess 12, the spring pieces 57 push the sensor 2 forward while the engagement between the second engaging portion 42 and the third coupling piece 7, and the engagement between the first and second coupling pieces 5 and 6, and the engaging surfaces 35A of the corresponding first engaging portions 27 limit the forward movement of the sensor 2. The sensor 2 is thus positioned and retained with regard to the fore and aft directions substantially solely at three points (the first coupling piece 5, the second coupling piece 6 and the third coupling piece 7) in a both firm and accurate manner.

Since the front surfaces of the first coupling piece 5, the second coupling piece 6 and the third coupling piece 7 are set back rearward with respect to the front surface of the sensor main body 4, the sensor 2 can be retained firmly by the first engaging portions 27 having a relatively robust structure while minimizing the fore and aft dimension of the sensor mounting structure at the same time.

The lateral positioning of the sensor 2 is accomplished by pressing the sensor 2 with the first pressing portions 26 against the first positioning portions 25. The first positioning portions 25 and the first pressing portions 26 do not provide a retaining force in the fore and aft direction so that the retaining action of the first engaging portions 27 and the second engaging portion 42 is not interfered by the action of the first positioning portions 25 and the first pressing portions 26. Likewise, the action of the first positioning portions 25 and the first pressing portions 26 to laterally retain the sensor 2 is not interfered by the retaining action of the first engaging portions 27 and the second engaging portion 42.

Since the lower first positioning portion 25A and the lower first pressing portion 26A are laterally aligned with each other and/or the upper first positioning portion 25B and the upper first pressing portion 26B are laterally aligned with each other, the sensor 2 can be laterally retained in a particularly favorable manner.

The vertical positioning of the sensor 2 is accomplished by pressing the sensor 2 with the second pressing portions 52 against the second positioning portions 51. Once the sensor 2 is in place, the second pressing portions 52, the second positioning portions 51, and the third engaging portions 45 provide substantially no retaining force in the fore and aft direction so that the retaining action of the first engaging portions 27 and the second engaging portion 42 is not interfered by the action of the second pressing portions 52, the second positioning portions 51, and the third engaging portions 45. Likewise, the action of the second pressing portions 52 and the second positioning portions 51 to vertically retain the sensor 2 is not interfered by the retaining action of the first engaging portions 27 and the second engaging portion 42.

The present invention has been described in terms of a specific embodiment, but the present invention is not limited by such an embodiment and can be modified in various ways without departing from the scope of the present invention.

For instance, in the illustrated embodiment, the first pressing portions 26, the first positioning portions 25, the second pressing portions 52, and the second positioning portions 51 are all provided in pairs, but any of them may be either single or more than two without departing from the broad concept of the present invention.

Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

The invention claimed is:

1. A sensor bracket for mounting a sensor to a vehicle body, comprising:
   a base wall opposing a back surface of the sensor;
   at least one first positioning portion projecting from the base wall and abutting a side edge of the sensor in a first direction extending along the base wall;
   at least one first pressing portion projecting from the base wall and pressing the sensor against the first positioning portion in the first direction; and
   a first engaging portion projecting from the base wall and engaging the sensor against a movement thereof away from the base wall,
   the first engaging portion being positioned between the at least one first positioning portion and the at least one pressing portion in the first direction,
   wherein the first engaging portion includes a pillar projecting from the base wall, and a claw extending from a tip end of the pillar in the first direction, and the claw includes an engaging surface facing the base wall and a bulge surface extending from an end of the engaging surface to the tip end of the pillar.

2. The sensor bracket according to claim 1, wherein the sensor includes a sensor main body, and a coupling piece extending from the sensor main body extending along the base wall in a second direction crossing the first direction, and one of the at least one first positioning portion or one of the at least one first pressing portion abuts against a side edge of the coupling piece.

3. The sensor bracket according to claim 2, wherein the coupling piece is positioned between the at least one first pressing portion and the at least one first positioning portion along the first direction.

4. The sensor bracket according to claim 2, wherein one of the at least one first positioning portion, one of the at least one first pressing portion, and the side edge of the first coupling piece substantially align with one another along the first direction.

5. The sensor bracket according to claim 2, wherein the coupling piece includes a first coupling piece and a second coupling piece that are positioned along the first direction in a spaced apart relationship, and one of the at least one first pressing portion presses against the first coupling piece while one of the at least one first positioning portion abuts against the second coupling piece.

6. The sensor bracket according to claim 5, further comprising an at least one second positioning portion abutting against the sensor in the second direction, and at least one second pressing portion pressing the sensor against the at least one second positioning portion in the second direction.

7. The sensor bracket according to claim 6, wherein the at least one second positioning portion includes a pair of second positioning portions, and the at least one second pressing portion includes a pair of second pressing portions, the second positioning portions abutting against tip ends of the first coupling piece and the second coupling piece, respectively.

8. The sensor bracket according to claim 2, wherein the sensor further includes a third coupling piece extending from a side of the sensor main body opposite from the first coupling piece and the second coupling piece, and a second engaging portion extending from the base wall to engage the third coupling piece against a movement of the sensor away from the base wall.

9. The sensor bracket according to claim 8, wherein the first engaging portion includes a pair of first engaging portions that are positioned in a mutually spaced apart relationship along the first direction between one of the at least one first positioning portion and one of the at least one first pressing portion, the sensor being restricted from a movement away from the base wall by the pair of first engaging portions and the second engaging portion.

10. The sensor bracket according to claim 9, wherein the first, second and third coupling pieces are each provided with a front surface which recedes from a front surface of the sensor main body.

11. The sensor bracket according to claim 1, wherein the at least one first positioning portion and the at least one first pressing portion are each provided in a pair which are spaced apart from each other in a second direction crossing the first direction.

12. The sensor bracket according to claim 1, wherein the base wall is provided with a spring portion that urges the sensor away from the base wall.

\* \* \* \* \*